United States Patent
Gebhardt et al.

(10) Patent No.: US 10,724,629 B2
(45) Date of Patent: Jul. 28, 2020

(54) TRANSMISSION ARRANGEMENT

(71) Applicant: CONTI TEMIC MICROELECTRONIC GMBH, Nuremberg (DE)

(72) Inventors: Marion Gebhardt, Graefenberg (DE); Juergen Henniger, Erlangen-Dechsendorf (DE); Michael Pechtold, Fuerth (DE); Andreas Schulze, Lauf A.D. Peg./OT Neunhof (DE); Matthias Wieczorek, Neunkirchen Am Sand (DE); Joachim Vom Dorp, Altdorf (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 393 days.

(21) Appl. No.: 15/325,732

(22) PCT Filed: Jul. 13, 2015

(86) PCT No.: PCT/EP2015/065934
§ 371 (c)(1),
(2) Date: Jan. 12, 2017

(87) PCT Pub. No.: WO2016/008831
PCT Pub. Date: Jan. 21, 2016

(65) Prior Publication Data
US 2017/0159800 A1    Jun. 8, 2017

(30) Foreign Application Priority Data

Jul. 15, 2014 (DE) .......................... 10 2014 213 680

(51) Int. Cl.
*F16H 61/00* (2006.01)
*F16H 57/02* (2012.01)

(52) U.S. Cl.
CPC ......... *F16H 61/0003* (2013.01); *F16H 57/02* (2013.01)

(58) Field of Classification Search
CPC ... F16H 61/0003; F16H 61/0006; F16H 57/02
See application file for complete search history.

(56) References Cited

U.S. PATENT DOCUMENTS

| | | | |
|---|---|---|---|
| 5,662,007 | A | 9/1997 | Staerker et al. |
| 7,724,531 | B2 | 5/2010 | Kanno et al. |
| 8,918,257 | B2 | 12/2014 | Kanzaki et al. |
| 2008/0006635 | A1* | 1/2008 | Bader ................... F16H 57/027 220/374 |

(Continued)

FOREIGN PATENT DOCUMENTS

| DE | 10036601 A1 | 2/2002 |
|---|---|---|
| DE | 102005028122 A1 | 12/2006 |
| DE | 102006048255 A1 | 4/2008 |

(Continued)

*Primary Examiner* — Edwin A Young
(74) *Attorney, Agent, or Firm* — Laurence A. Greenberg; Werner H. Stemer; Ralph E. Locher

(57) ABSTRACT

A gear assembly has a gear housing. A first component group is arranged in a first partial area within the gear housing. The first component group includes at least one sensor element and/or at least one actuator. A remote control device is coupled to the first component group so that signals can be exchanged by way of a bus system.

8 Claims, 1 Drawing Sheet

(56) References Cited

U.S. PATENT DOCUMENTS

2009/0143947 A1   6/2009   Bezdek
2011/0004348 A1   1/2011   Ketteler et al.

FOREIGN PATENT DOCUMENTS

| DE | 102008059348 A1 | 7/2009 |
| DE | 102008000639 A1 | 9/2009 |
| DE | 102011015273 A1 | 10/2011 |
| JP | H08510317 A | 10/1996 |
| JP | H11141664 A | 5/1999 |
| JP | 2013256979 A | 12/2013 |
| WO | 2005050805 A1 | 6/2005 |

* cited by examiner

TRANSMISSION ARRANGEMENT

BACKGROUND OF THE INVENTION

Field of the Invention

The invention relates to a transmission arrangement.

In motor vehicles, control units and electronic components such as sensors are used for different tasks. For example, rotational speeds of shafts and positions of gear speed actuators are measured in a transmission by means of sensors.

BRIEF SUMMARY OF THE INVENTION

The object on which the invention is based is to provide a transmission arrangement for a transmission which permits reliable operation of the transmission and at the same time contributes to permitting the transmission to be manufactured in a cost-effective and weight-saving fashion.

The object is achieved by means of the features of the independent patent claim. Advantageous developments of the invention are characterized in the dependent claims.

The invention is distinguished by a transmission arrangement having a transmission housing which comprises a first component group which is arranged in a first area within the transmission housing. The first component group has at least one sensor element and/or at least one actuator.

In addition, the transmission arrangement comprises an in-situ control device which is coupled in terms of signaling to the first component group by means of a bus system. The in-situ control device is designed to receive on the input side sensor signals of the at least one sensor element and to transmit on the output side actuation signals to the at least one actuator.

Such an arrangement has the advantage that the in-situ control device and the first component group can be replaced separately in the event of a defect. In addition, the bus system permits reliable communication between the component group and the in-situ control device. Furthermore, the use of a bus system permits a number of lines between the first component group and the in-situ control device to be kept low.

The at least one actuator is embodied, for example, as a valve of a transmission hydraulics system. The at least one sensor element is arranged, for example, in the direct vicinity of the at least one actuator. The at least one sensor element can be embodied, for example, as a pressure element, a temperature element, shift fork travel element or rotational speed sensor element.

Owing to the application, for example a plurality of sensor elements are arranged in the first area of the transmission housing and secured mechanically in the transmission housing by means of a sensor carrier plate. Such an arrangement can also be referred to as a "sensor cluster". For example, the first component group comprises a sensor cluster.

The first component group is arranged in an interior space of the transmission housing, which space is, for example, isolated in a liquid-tight fashion from an outer region of the transmission housing, arranged outside the transmission housing. In one embodiment, the in-situ control device is arranged outside the transmission housing. This has the advantage that the requirements which are made of the in-situ control device in terms of temperature-resistance can be significantly less compared to an arrangement of the in-situ control device inside the transmission housing.

In addition, for example less strong accelerations occur in the outer area of the transmission housing than in the interior space. The arrangement of the in-situ control device outside the transmission housing thus contributes to robustness of the transmission arrangement.

The interior space of the transmission housing has, for example, oil. Requirements relating to resistance of the in-situ control device to oil can therefore, for example, be lower in the case of the arrangement of the in-situ control device in the outer area of the transmission housing than in the case of an arrangement of the in-situ control device inside the transmission housing.

In a further embodiment, the in-situ control device is arranged inside the transmission housing. In this way, lines of the bus system between the component group and the in-situ control device can advantageously be kept short.

In a further embodiment, the in-situ control device is arranged on an outer wall of the transmission housing. This contributes to keeping the lines of the bus system between the component group and the in-situ control device relatively short and at the same time permits requirements made of the temperature resistance and acceleration resistance of the in-situ control device as well as its resistance to oil to be kept low.

In a further embodiment, the first component group comprises a first communication interface.

The first communication interface is, in particular, designed to couple the first component group in terms of signaling to the bus system. The first communication interface is designed, in particular, to couple the at least one sensor element of the first component group and/or the at least one actuator of the first component group in terms of signaling to the bus system.

The first communication interface is designed, for example, to pre-process or encode the sensor signals or decode the actuation signals. For example, the first communication interface is also designed to check the plausibility of the sensor signals.

In a further embodiment, the bus system is designed to couple the in-situ control device in terms of signaling exclusively to one or more bus users arranged inside the transmission housing.

This has the advantage that a contribution is made to reliable operation of the transmission. Decoupling of the bus system from a further vehicle network permits, in particular, a high degree of immunity to interference and a high transmission speed.

In a further embodiment, at least one further component group is arranged in a respective further area inside the transmission housing. The at least one further component group has at least one respective further sensor element and/or at least one respective further actuator. The at least one further component group is coupled in terms of signaling to the in-situ control device by means of the bus system.

This has the advantage that efficient communication between the component groups and the in-situ control device is made possible even in the case of sensor elements and/or actuators which are spatially far apart from one another.

For example, a plurality of sensor elements are arranged in the first area of the transmission housing, and a plurality of sensor elements are arranged in the respective further area of the transmission housing. The respective further area is, for example, spatially far away from the first area, so that the first component group and the at least one further component group are arranged, for example, at opposite end regions of the transmission housing.

In a further embodiment, the at least one further component group comprises a respective further communication interface.

The respective further communication interface is embodied in an analogous fashion to the first communication interface, in particular is designed to couple the at least one further component group in respect of signaling to the bus system. The respective further communication interface is designed, in particular, to couple the at least one respective further sensor element of the at least one further component group and/or the at least one respective further actuator of the at least one further component group in respect of signaling to the bus system.

The respective further communication interface is also designed, in a way analogous to the first communication interface, for example to perform pre-processing or encoding of the sensor signals, for example decoding of the actuation signals. Furthermore, the respective further communication interface is designed, for example, to perform plausibility checking of the sensor signals of the at least one further component group.

The first component group and the at least one further component group each represents a bus user which is arranged inside the transmission housing.

BRIEF DESCRIPTION OF THE SEVERAL VIEWS OF THE DRAWING

Exemplary embodiments of the invention are explained below with reference to the schematic drawings, in which.

Elements of the same design or function are provided with the same reference symbols in all the figures.

DESCRIPTION OF THE INVENTION

Figure 1:
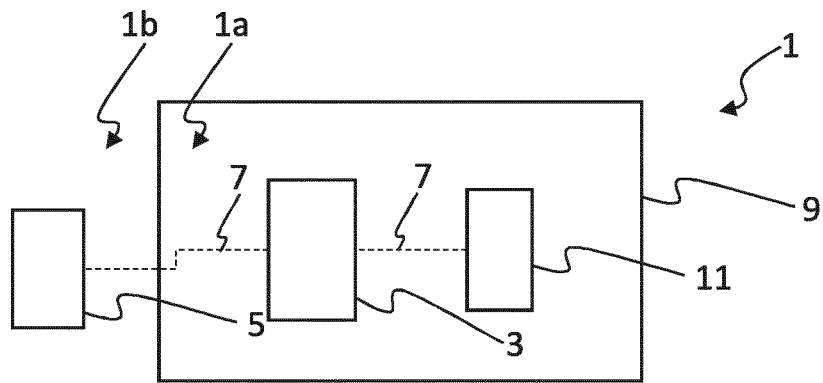
FIG. 1 shows a first exemplary embodiment of a transmission arrangement.

FIG. 1 shows the first exemplary embodiment of a transmission arrangement of an automatic transmission having a transmission housing 1 in the interior space 1a of which a first component group 3 is arranged.

The first component group 3 comprises at least one actuator which is embodied, for example, as an electronically controlled valve of transmission hydraulics.

In addition, the first component group 3 comprises, for example, for determining operating parameters of the at least one actuator, at least one sensor element which is arranged in the direct vicinity of the at least one actuator. The at least one sensor element is embodied, for example, as a temperature sensor or as a pressure sensor.

For example, the at least one sensor element is embodied as a Hall sensor and is arranged in the direct vicinity of the shaft in order to determine a rotational speed of a shaft, for example of a transmission input shaft. For example, the at least one sensor element is embodied as a travel sensor which is arranged in the direct vicinity of a shift fork in order to determine the position of said shift fork.

For example, the at least one sensor element is embodied with a plastic carrier as a sensor dome. The at least one sensor element is soldered, for example, to a stamped grating for the purpose of coupling in terms of signaling.

The at least one sensor dome is screwed, for example, to a sensor carrier plate and placed in contact, for example, with a foil conductor. The sensor carrier plate with the at least one sensor dome can also be referred to as a so-called "sensor cluster". On an underside of the sensor carrier plate lying opposite the at least one sensor dome, for example a valve-contact-forming plate is arranged which has a respective recess for receiving the at least one valve. The sensor carrier plate with the at least one sensor dome is secured, for example by screwing, to the transmission hydraulics or to the transmission housing.

The first component group 3 additionally comprises a first communication interface. The first communication interface is coupled, for example, via the foil conductor to the at least one sensor element and/or the at least one actuator. Alternatively, the at least one sensor element comprises the first communication interface, and/or the at least one actuator comprises the first communication interface.

Inside the transmission housing 1, that is to say in the interior space 1a, operating temperatures of up to 150° C. can occur. The interior space 1a additionally has, for example, a chemically aggressive oil. Strong accelerations such as vibrations in the interior space 1a additionally increase the requirements made of components arranged in the transmission housing 1.

As a result, an in-situ control device 5 is arranged outside the transmission housing in an outer area 1b. The transmission arrangement has a bus system 7 for the purpose of coupling the in-situ control device 5 in terms of signaling to the first component group 3.

The bus system 7 is coupled in terms of signaling to the first communication interface. The first communication interface is designed, for example, to encode sensor signals and decode actuation signals. The first communication interface serves, in particular, to couple the at least one sensor element of the first component group 3 and/or the at least one actuator of the first component group 3 in terms of signaling to the in-situ control device 5.

For example, the first communication interface is designed to encrypt sensor signals of the at least one sensor element. For example, the first communication interface is designed to compress data contained in the sensor signals of the at least one sensor element. For example, the first communication interface is designed to add checksums for verifying the data contained in the sensor signals of the at least one sensor element.

Analogously to this, the first communication interface is designed, for example, to decrypt actuation signals of the in-situ control device 5 or decompress data contained therein.

In order to check the plausibility of the sensor signals of the at least one sensor element, the first communication interface is, for example, additionally designed to request sensor data from the at least one sensor element.

The bus system 7 is embodied as a sequential bus as in the first exemplary embodiment. Alternatively, the bus system 7 is embodied, for example, as a ring bus.

The bus system 7 is embodied, for example, as a serial two-bit bus, so that the number of lines can be kept small. The low number of lines and the low number of necessary plug-type connections contribute to reliable operation of the transmission.

For example, the in-situ control device 5 is arranged on an outer wall 9 of the transmission housing 1, so that the lines of the bus system 7 can be kept short.

The low number and the short length of the lines of the bus system 7 contribute to permitting the transmission arrangement to be manufactured in a weight-saving and cost-effective manner. Additionally, compared to an arrangement of the in-situ control device 5 in the interior space 1a of the transmission housing 1, complicated protection of the in-situ control device 5 against environmental influence is provided only optionally in the interior space 1a of the transmission housing 1 if the in-situ control device 5 is arranged in the outer region 1b of the transmission housing 1.

A separate arrangement of the in-situ control device 5 and of the first component group 3 contributes, in the event of a defect of an individual component, to cost-effective, simple exchange of the defective component.

The transmission arrangement also comprises, in a respective further area of the transmission housing 1, at least one further component group 11, having at least one respective further sensor element and/or at least one respective further actuator. In addition, the at least one further component group 11 comprises a respective further communication interface by means of which the at least one further component group 11 is coupled to the in-situ control device 5 via the bus system 7. For example, the first area of the transmission housing 1 is a coupling space of the transmission, and the respective further area of the transmission housing 1 is a wheel housing of the transmission.

The bus system 7 is designed to couple the in-situ control device 5 in terms of signaling exclusively to bus users which are arranged inside the transmission housing 1. For example, the in-situ control device 5 is exclusively coupled in terms of signaling to the first component group 3 and to the at least one further component group 11 via the bus system 7. Decoupling of the bus system 7 in terms of signaling from other components contributes to high-speed transmission of the sensor signals and/or of the actuation signals. In addition, the probability of faults during simultaneous description of the bus system 7 is minimized, thereby contributing to reliability of the transmission. In particular, the bus system 7 contributes in this way to satisfying safety-relevant requirements of automatic transmissions.

Figure 2:
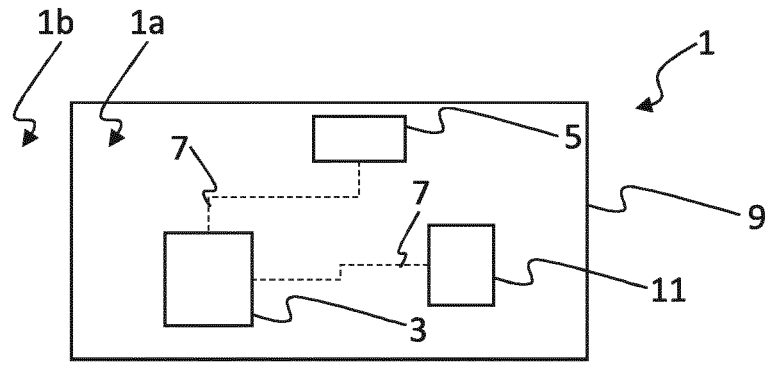
FIG. 2 shows a second exemplary embodiment of a transmission arrangement.

The transmission arrangement in FIG. 2 differs from the transmission arrangement of the first exemplary embodiment in the arrangement of the in-situ control device 5. In this case, the in-situ control device 5 is arranged in the interior space 1a of the transmission housing 1. The in-situ control device 5 has a coating or a housing which protects the in-situ control device 5 against external influence such as oil and/or vibrations. In addition, the in-situ control device 5 has, for example, a cooling element.

The in-situ control device 5 is coupled in terms of signaling, in a way analogously to the first exemplary embodiment, to the communication interfaces of the first component group 3 and of the at least one further component group 11 via the bus system 7. As a result of the arrangement of the in-situ control device 5 in the interior space 1a of the transmission housing 1, the lines of the bus system 7 are made particularly short, so that a contribution can be made to cost-effective, weight-saving manufacture of the transmission.

LIST OF REFERENCE NUMBERS

1 Transmission
1a Interior space
1b Outer area
3 First component group
5 In-situ control device
7 Bus system
9 Outer wall
11 Further component group

The invention claimed is:

1. A transmission arrangement, comprising:
   a transmission housing;
   a bus system;
   a component group directly connected to said bus system, said component group being disposed in a first area within said transmission housing, said component group having at least one sensor element and/or at least one actuator;
   an in-situ control device directly connected to said bus system; and
   said bus system enabling a signal exchange between in-situ control device and said component group, and forming a direct physical connection between said in-situ control device and said component group.

2. The transmission arrangement according to claim 1, wherein said in-situ control device is arranged outside said transmission housing.

3. The transmission arrangement according to claim 1, wherein said in-situ control device is arranged inside said transmission housing.

4. The transmission arrangement according to claim 1, wherein said transmission housing has an outer wall and said in-situ control device is disposed on said outer wall of said transmission housing.

5. The transmission arrangement according to claim 1, wherein said component group comprises a communication interface.

6. The transmission arrangement according to claim 1, wherein said bus system is configured to couple said in-situ control device in terms of signaling exclusively to one or more bus users arranged inside said transmission housing.

7. The transmission arrangement according to claim 1, wherein said component group is a first component group and the arrangement includes at least one further component group disposed in a respective further area inside said transmission housing, wherein said at least one further component group includes at least one respective further sensor element and/or at least one respective further actuator and said at least one further component group is coupled in terms of signaling to said in-situ control device by way of said bus system.

8. The transmission arrangement according to claim 7, wherein said further component group comprises a respective further communication interface.

* * * * *